Feb. 16, 1954     I. W. LICHTENFELS     2,669,685
DYNAMIC BRAKING SYSTEM FOR ELECTRIC MOTORS
Filed Sept. 26, 1952
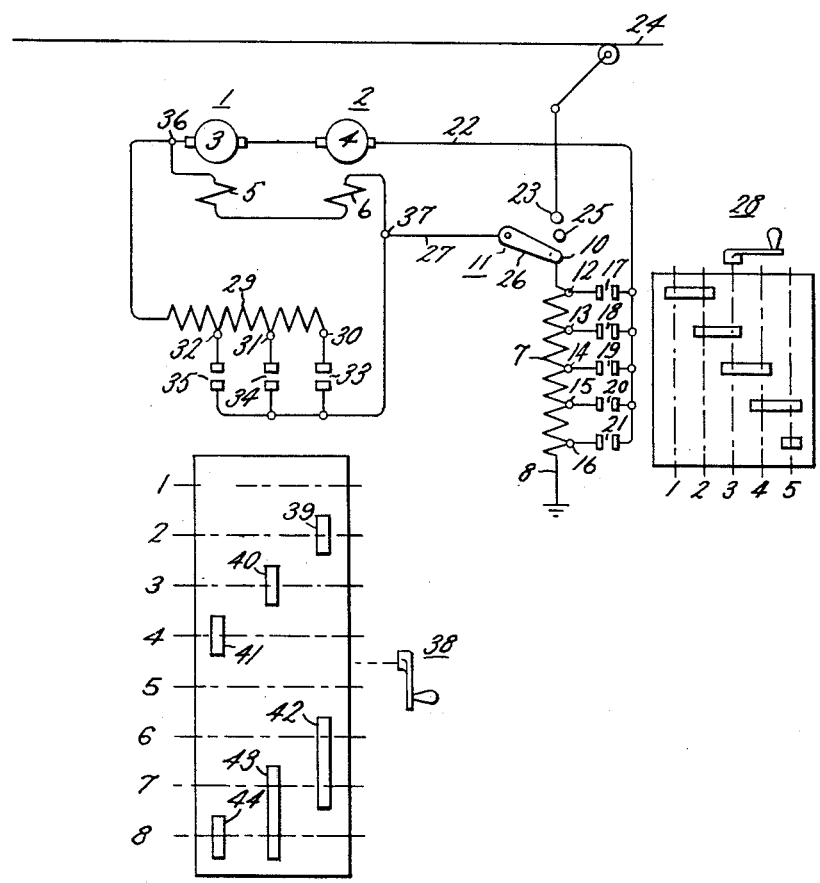
Inventor:
Ira W. Lichtenfels,
by *Claude A. Nott*
His Attorney.

Patented Feb. 16, 1954

2,669,685

UNITED STATES PATENT OFFICE 2,669,685

DYNAMIC BRAKING SYSTEM FOR ELECTRIC MOTORS

Ira W. Lichtenfels, Harborcreek, Pa., assignor to General Electric Company, a corporation of New York Application September 26, 1952, Serial No. 311,665

5 Claims. (Cl. 318—262)

This invention relates to control systems for commutator type motors and more particularly to control systems providing both motoring and dynamic braking connections.

In many applications for commutator type motors, particularly in electric drive vehicles such as electric locomotives and trolley cars, it has been the practice to provide a control system having both motoring and dynamic braking connections. In such systems, a resistance bank is provided which is connected in series with the motor armatures and field windings across a source of power to provide the motor connection. When power is initially applied to the motoring circuit, all of the resistance bank is connected in circuit and as the motors come up to speed, the control system progressively cuts out sections of the resistance bank until the motor armatures and field windings are eventually connected directly across the line. In dynamic braking, the same resistance bank is connected across the motor armatures and field windings with the connection to the source of power being broken so that the output of the motors, being driven as generators by the motion of the vehicle, is dissipated in the resistance bank. In dynamic braking, it is desirable that the braking resistance dissipate the maximum possible armature current in order to secure the maximum braking effort. Therefore, the entire resistance bank is initially connected across the motor armatures and fields when dynamic braking is entered and as the vehicle slows down, the control system again progressively cuts out sections of the resistance in order to maintain substantially constant braking current. In systems of the type outlined above, it has also been found desirable to incorporate a provision for field shunting in the control system. This field shunting is provided by a shunting resistance having sections adapted to be selectively connected across the motor field windings in order to selectively divert or shunt current from the field windings. Thus, in the motoring connection when the vehicle is accelerating, after the accelerating resistance has been cut out of the motor circuit, the control system progressively inserts shunting resistance in parallel with the motor fields until a substantial portion of the load current is shunted around the fields, thus further increasing the speed and power output of the motors.

In braking, the series commutator motor, acting as a generator forcing current through the resistance bank, can be caused to produce constant current with varying motor speed, as caused by the slowing up of vehicles, by varying either the resistance or the strength of the exciting field. Varying field strength has several advantages for high speed dynamic braking, the two principal advantages being the limitation of motor voltage and kilowatt output. Field shunting is thus used in dynamic braking in which case the control system connects the shunting resistance for maximum shunting when dynamic braking is entered and, as the vehicle slows down, progressively inserts resistance in the shunting connection to reduce shunting thus increasing motor field current and in turn armature current to maintain constant armature current. After the shunting resistance has been completely disconnected from the motor fields, the braking resistance is then progressively cut out of the circuit, as described above.

The use of field shunting during dynamic braking has in the past been limited by the slow traction motor response. Thus, due to the inherent slow motor response to a change in field shunting resistance, very little change in armature current takes place until an appreciable amount of shunting resistance has been added to the shunting connection and at that time a sudden large scale increase in current takes place. It is therefore desirable to provide a dynamic braking control circuit having provision for field shunting which provides immediate motor response to changes in field shunting resistance.

An object of this invention is therefore to provide an improved motor control system incorporating field shunting during a dynamic braking connection and wherein changes in field shunting resistance are accompanied by immediate motor response.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a dynamic braking circuit is provided comprising a commutator type motor having an armature and a field winding connected to a braking resistance. A field shunting resistance is provided with switching means arranged selectively to connect different portions of the shunting resistance in shunting relationship with the motor field winding thereby to provide a plurality of field shunting steps. The switching means is arranged to open the circuit of the shunting resistance between each of its positions so that full field is applied to the motor between each field shunting step. This field forcing system provides a momentary quick pulse of current between field shunting steps in order to accelerate the build-up of armature current.

The single figure of the drawing schematically illustrates the improved motor control system of this invention.

Referring now to the drawing, there is shown a pair of traction motors 1 and 2 having their armatures 3 and 4 connected in series with their field exciting windings 5 and 6. An accelerating and braking resistance 7 is provided having its end 8 connected to a ground return path and its end 9 connected to position 10 of double throw switch 11. The resistance bank 7 is provided with a plurality of taps 12 to 16 inclusive which in turn are respectively connected to one side of cam actuated contacts 17 to 21, inclusive. The other side of the cam actuated contacts 17 to 20, inclusive, are connected to one side of the armature-field circuit by means of line 22. Double pole switch 11 is provided with a position 23 connected to the other side of a source of power, for example to trolley wire 24. Double pole switch 11 has a neutral position 25 and has its movable element 26 connected to the other side of the armature-field circuit by means of line 27. In order to actuate contacts 17 to 21 inclusive, a drum controller 28 is provided having a cam development as shown in the drawing.

In order to provide field shunting for the fields 5 and 6 of motors 1 and 2, a field shunting resistance 29 is provided having one end connected to the armature-field circuit, as at 36, and having taps 30, 31 and 32 connected respectively to cam actuated contacts 33, 34 and 35. The other sides of the cam actuated contacts 33, 34 and 35 are connected to the other side of field winding 6 as at 37. Contacts 33, 34 and 35 are actuated by drum controller 38, shown here as having 8 positions and a cam development as shown in the drawing. Controller 38 includes two groups of cams, the first group including cams 39, 40 and 41 and the second group including cams 42, 43 and 44. It will be noted that cams 39, 40 and 41, which are used to actuate contacts 33, 34 and 35 during dynamic braking, are circumferentially spaced apart, i. e. they do not mutually overlap so that one contact does not open until another contact is closed. Also it can be seen that cams 42, 43 and 44, which are used to actuate contacts 33, 34 and 35 during motoring, do overlap circumferentially so that contact 33 does not open until contact 34 closes, and so on.

In operation, assuming that controller 38 is in the first position and switch 11 in its neutral position 25, and with the vehicle at rest, in order to start the vehicle, controller 38 is moved from a first position to the fifth position thus successively closing contacts 33, 34 and 35. However, since switch 11 is on its neutral position 25, and since the car is at rest, no armature current will flow. With controller 38 in its position 5 in which none of the contacts 33, 34 and 35 are closed, switch 11 is moved to its motoring position 23 thus connecting armatures 3 and 4 and their fields 5 and 6 in series with accelerating braking resistance 7 between trolley wire 24 and the ground return. Controller 28 is in the first position when motoring is initiated and it is thus seen that contacts 17 are closed so that all of the accelerating braking resistance 7 is connected in series with the motor armatures 3 and 4 and field windings 5 and 6. The circuit is traced starting with trolley line 24 through switch 11 and its position 23, line 27, field windings 6 and 5, motor armatures 3 and 4, line 22, contacts 17, and resistance 7 to the ground return. As the motor speed increases, it is desirable to progressively cut out sections of resistance 11 and thus controller 28 is progressively moved from its first position to its fifth position in which it is seen contact 21 is closed thus connecting the armatures 3 and 4 and fields 5 and 6 directly between trolley wire 24 and the ground return. With the accelerating and braking resistance completely cut out, controller 38 is then progressively moved from position 6 to position 8. It will be seen that in position 6, cam 42 closes contact 33 to insert the maximum amount of shunting resistance 29 in parallel with fields 5 and 6 thus diverting minimum shunting current to weaken fields 5 and 6. In position 7, cam 42 still closes contact 33, however, cam 43 now closes contact 34 so that the resistance across fields 5 and 6 is reduced thus diverting a larger amount of shunting current to further weaken the fields. In position 8, cam 43 still closes contact 34. However, cam 44 now closes contact 35 to insert the minimum shunting resistance in parallel with fields 5 and 6 to provide maximum field shunting.

It will be readily understood that the controllers 28 and 38 may be driven by pilot motors which are actuated in response to motor armature current and further, that switch 11 may actually be incorporated into controller 38. Such an arrangement is completely shown and described in my copending application Serial Number 192,269 filed October 26, 1950, and assigned to the assignee of the present application.

In entering dynamic braking at full speed, switch 11 is moved away from its motoring position 23 to its neutral position 25 thus disconnecting motors 1 and 2 from trolley wire 24. Controller 38 is then moved from its position 8 to its position 4 in which cam 41 closes contact 35. Switch 11 is then moved to its position 10 and since controller 28 was in its fifth position, it will be seen that contact 21 is closed thus connecting the entire accelerating braking resistance 7 across motor armatures 3 and 4 and fields 5 and 6. This circuit can be traced starting with switch 11 through line 27, field windings 6 and 5, motor armatures 3 and 4, line 22, and contact 21 to resistor 7. When switch 11 is thrown to its braking position 10, with controller 38 in its position 4 and with cam 41 closing contact 35, the minimum amount of shunting resistance 29 is connected across fields 5 and 6 thus providing maximum field shunting to divert the maximum amount of current around fields 5 and 6. As the vehicle slows down and the motor armature current falls, controller 38 is moved to position 3 so that contact 35 is opened and contact 34 is closed. Here it will be observed that when controller moves from position 4 to position 3, cam 41 will open contact 35 before cam 40 will close contact 34. Thus, for a moment field windings 5 and 6 will not be shunted thus giving a quick pulse of full voltage to the field windings. This allows momentary full field condition for the motors 1 and 2 to accelerate the build-up of current. In position 3, cam 40 closes contact 34 thus inserting a somewhat larger section of resistance 29 across field windings 5 and 6 thereby diverting less current around windings 5 and 6 and in turn increasing the excitation provided by windings 5 and 6 to maintain constant armature current. As the armature current continues to fall, controller 38 is moved from position 3 to position 2. Here again, it is seen that cam 40 will open contact 34 before cam 39 closes contact 33 and here again, for a momentary period, the shunting resistance 29 is completely disconnected from fields 5 and 6 so that a pulse of full voltage is applied across fields 5 and 6. Controller 38 is then moved to position 1 in which none of the contacts 33, 34 and 35 are closed so that no field shunting is provided. As the armature current continues to drop as the vehicle slows down, controller 28 is moved from its position 5 back to position 1 progressively connecting smaller section of resistance 7 across armatures 3 and 4 and fields 5 and 6 to maintain constant current. It has been found that the momentary application of full field between field shunting steps in dynamic braking produces an immediate build-up of armature current as contrasted with a very slow speed response when no pulsing was provided.

It will now be seen that this invention provides an improved motor control system incorporating both motoring and dynamic braking wherein field shunting is utilized to control motor armature current during braking and wherein the motors immediately respond to a change in field shunting resistance by virtue of the field pulsing intermediate the field shunting steps.

While I have shown and described a specific embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. A dynamic braking circuit comprising a commutator type motor having an armature and a field winding, a braking resistor, first switching means arranged to connect said braking resistor in circuit with said armature and field winding whereby power generated by said motor when driven as a generator is dissipated in said braking resistor, a field shunting resistor having a plurality of taps, and a controller having a plurality of contacts for progressively connecting said taps in circuit with said field winding thereby to connect progressively larger sections of said braking resistor in shunting relationship with said field winding to provide a plurality of field shunting steps, said contacts being of such size and position with respect to said controller as to disconnect all of said taps from said field winding between each connection whereby full field is applied to said motor between each of said field shunting steps thereby to accelerate build-up of armature current.

2. A dynamic braking circuit comprising a commutator type motor having an armature and a field winding, a braking resistor, first switching means arranged to connect said braking resistor in circuit with said armature and field winding whereby power generated by said motor when driven as a generator is dissipated in said braking resistance, a field shunting resistor having a plurality of taps, and a multiple position drum controller having a plurality of cam actuated contacts arranged progressively to connect said taps in circuit with said field winding thereby to connect progressively larger sections of said braking resistor in shunting relationship with said field winding to provide a plurality of field shunting steps, said controller cams being circumferentially spaced apart so that none of said taps are connected to said field winding between each of said positions whereby full field is applied to said motor between each of said field shunting steps thereby to accelerate build-up of armature current.

3. A motor control system comprising a commutator type motor having an armature and a field winding, an accelerating and braking resistance; first switching means having a first position connecting said motor, field winding, and accelerating and braking resistance in circuit with a source of power to establish a motoring circuit; said first switching means having a second position connecting said motor, field winding and accelerating and braking resistance in a dynamic braking circuit so that power generated by said motor when driven as a generator is dissipated in said accelerating and braking resistance, a field shunting resistor, and second switching means having a plurality of positions, said second switching means being arranged to selectively connect different portions of said shunting resistor in shunting relationship with said field winding in a first group of said positions thereby to provide a first plurality of field shunting steps when said motoring circuit is established, said second switching means being arranged so that said shunting resistor portions remain connected to said field winding between each of said first group of positions, said second switching means being arranged selectively to connect different portions of said shunting resistor in shunting relationship with said field winding in a second group of positions thereby to provide a second plurality of field shunting steps when said braking circuit is established, said second switching means having contacts operable to open the circuit of said shunting resistor between each of said second group of positions whereby full field is applied to said motor between each of said second plurality of field shunting steps thereby to accelerate build-up of armature current during dynamic braking.

4. A motor control system comprising a commutator type motor having an armature and a field winding, an accelerating and braking resistance; first switching means having a first position connecting said motor, field winding, and accelerating and braking resistance in circuit with a source of power to establish a motoring circuit; said first switching means having a second position connecting said motor, field winding and accelerating and braking resistance in a dynamic braking circuit so that power generated by said motor when driven as a generator is dissipated in said accelerating and braking resistance, a field shunting resistor, and a multiple position drum controller having a plurality of cam-actuated contacts adapted with said field winding, said controller having a first group of cams arranged progressively to close said contacts thereby to connect progressively larger sections of said shunting resistor in shunting relationship with said field winding to provide a first plurality of field shunting steps when said motoring circuit is established, said first group of cams being circumferentially overlapped so that said shunting resistor sections remain connected to said field windings between each of said first shunting steps, said controller having a second group of cams arranged progressively to close said contacts thereby to connect progressively larger sections of said shunting resistor in shunting circuit relation with said field winding to provide a second plurality of field shunting steps when said braking circuit is established, said second group of cams being circumferentially spaced apart so that none of said contacts are closed between each of said second shunting steps whereby full field is applied to said motor between each of said second plurality of field shunting steps thereby to accelerate build-up of armature current during dynamic braking.

5. A dynamic braking circuit comprising a commutator type motor having an armature and field winding, a braking resistor, first switching means arranged to connect said braking resistor in circuit with said armature and said field winding whereby power generated by said motor when driven as a generator is dissipated in said braking resistor, a field shunting resistor having one side connected to one side of said field winding and having a plurality of taps, a multiple position controller, and contacts operable by said controller to selectively connect one of said taps to the other side of said field winding, said contacts operable to connect said taps to the other side of said field winding during at least two of said positions of said controller thereby to provide a plurality of field shunting steps, said contacts being operable by said controller to open the circuit of said field shunting resistor between each of said positions whereby full field is applied to said motor between each of said field shunting steps thereby to accelerate build up of armature current.

IRA W. LICHTENFELS.

References Cited in the file of this patent

UNITED STATES PATENTS

| Number | Name | Date |
|---|---|---|
| 1,230,935 | Skinner | June 26, 1917 |
| 2,120,954 | McNairy | June 14, 1938 |
| 2,436,330 | Purifoy | Feb. 17, 1948 |
| 2,523,143 | Riley et al. | Sept. 19, 1950 |